US007335411B2

(12) United States Patent
Lin et al.

(10) Patent No.: US 7,335,411 B2
(45) Date of Patent: Feb. 26, 2008

(54) METHOD OF PRODUCING A TIRE COMPOSITION HAVING IMPROVED SILICA REINFORCEMENT

(75) Inventors: Chenchy Jeffrey Lin, Hudson, OH (US); William L. Hergenrother, Akron, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 263 days.

(21) Appl. No.: 11/259,505

(22) Filed: Oct. 26, 2005

(65) Prior Publication Data

US 2006/0089446 A1  Apr. 27, 2006

Related U.S. Application Data

(60) Provisional application No. 60/622,006, filed on Oct. 26, 2004.

(51) Int. Cl.
*B29D 23/00* (2006.01)

(52) U.S. Cl. ............... 428/36.3; 428/36.7; 428/36.8; 428/36.91; 524/526; 524/571; 524/572; 524/573; 524/574; 524/575; 524/575.5

(58) Field of Classification Search .............. 428/36.3, 428/36.7, 36.8, 36.91; 524/526, 571, 572, 524/573, 574, 575, 575.5

See application file for complete search history.

(56) References Cited

U.S. PATENT DOCUMENTS

| 5,508,333 | A | 4/1996 | Shimizu | 524/424 |
|---|---|---|---|---|
| 5,811,479 | A | 9/1998 | Labauze | 524/188 |
| 6,008,295 | A | 12/1999 | Takeichi et al. | 525/105 |
| 6,057,387 | A * | 5/2000 | Mahmud et al. | 523/215 |
| 6,780,925 | B2 * | 8/2004 | Materne et al. | 524/571 |
| 2004/0030027 | A1 * | 2/2004 | Konno et al. | 524/493 |

* cited by examiner

*Primary Examiner*—Bernard Lipman
(74) *Attorney, Agent, or Firm*—Arthur M. Reginelli; Meredith E. Hooker

(57) ABSTRACT

Vulcanizable elastomeric compositions and vulcanizates are prepared by employing a strong acid. The strong acid is believed to enhance the reaction between a silica particle and a silica-reactive compound.

19 Claims, No Drawings

METHOD OF PRODUCING A TIRE COMPOSITION HAVING IMPROVED SILICA REINFORCEMENT

This application claims the benefit of U.S. Provisional Application No. 60/622,006, filed Oct. 26, 2004, which is incorporated herein by reference.

FIELD OF THE INVENTION

One or more embodiments of this invention relate to a method for preparing a vulcanizable elastomeric composition that is useful in producing tire compositions with improved silica reinforcement.

BACKGROUND OF THE INVENTION

Inorganic fillers, such as silica, impart improved wet traction, rolling resistance, tear strength, snow traction and other performance parameters when used as filler within tire treads. Mixing silica into a tire stock, however, is difficult because silica particles agglomerate extensively and therefore they are not easily dispersed. In addition, silica particles are less compatible than carbon black with rubber molecules. In response, processing and dispersing aids and coupling agents are used during compounding.

In the art of making tires, it is desirable to employ rubber vulcanizates that demonstrate improved rolling resistance, wet skid resistance, and reduced hysteresis loss at certain temperatures. Factors believed to affect these properties include the degree of filler networking (particle agglomeration), the degree of polymer-filler interaction, the cross-link density of the rubber, and polymer free ends within the cross-linked rubber network.

Because precipitated silica has been increasingly used as reinforcing particulate filler in tires, there is a need to overcome the processing problems associated with silica fillers. Additionally, there is a need to increase polymer-filler interaction in silica-filled tires, thereby improving rolling resistance, wear resistance, and wet skid resistance.

SUMMARY OF THE INVENTION

In one embodiment, the present invention provides a method for preparing a tire, the method comprising the steps of mixing ingredients including silica and at least one elastomer to form a first mixture, where the elastomer optionally includes silica-reactive functionalized elastomer, cooling the first mixture, further mixing the first mixture, optionally with additional ingredients including a silica coupling agent and a silica reactive dispersing agent, to form an intermediate mixture, with the proviso that at least one of the ingredients mixed to form the first mixture or the additional ingredients added to form the intermediate composition includes a silica-reactive compound, adding ingredients including a curative to the intermediate mixture to form a vulcanizable mixture, mixing the vulcanizable mixture, forming the vulcanizable mixture into a tire component, building a tire by including the tire component, curing the tire; where a strong acid is added to at least one of said step of mixing ingredients to form a first mixture or said step of further mixing to form an intermediate mixture.

The present invention also includes a method for preparing a tire, the method comprising the steps of mixing ingredients including silica-reactive functionalized elastomer, silica, strong acid and optionally additional rubbery polymer to form an initial composition, cooling the initial composition, further mixing the initial composition, optionally with additional ingredients including a silica coupling agent and a silica reactive dispersing agent, to form an intermediate composition, adding ingredients including a curative to the intermediate composition to form a vulcanizable mixture, mixing the vulcanizable mixture, forming the vulcanizable mixture into a tire component, building a tire by including the tire component, curing the tire; where said strong acid has a $pK_a$ of less than or equal to the $pK_a$ of acetic acid when compared under standardized conditions.

The present invention further includes a method for preparing a tire, the method comprising the steps of mixing ingredients including silica and at least one elastomer to form an initial composition, where the elastomer optionally includes silica-reactive functionalized elastomer, cooling the initial composition, further mixing the initial composition with additional ingredients including at least one of a silica coupling agent and a silica reactive dispersing agent to form an intermediate composition, adding ingredients including a curative to the intermediate composition to form a vulcanizable mixture, mixing the vulcanizable mixture, forming the vulcanizable mixture into a tire component, building a tire by including the tire component, curing the tire; where said method includes the step of adding a strong acid, and where said strong acid is added prior to or during said step of further mixing.

The present invention also includes a method for forming a mixture, the method comprising mixing a silica particle, a silica-interactive compound, and a strong acid, where said strong acid has a $pK_a$ of less than or equal to the $pK_a$ of acetic acid when compared under standardized conditions.

DETAILED DESCRIPTION OF ILLUSTRATIVE EMBODIMENTS

In one or more embodiments vulcanizable compositions are prepared by mixing silica, a silica-reactive compound, and a strong acid. In certain embodiments, the strong acid is believed to enhance the reaction between the silica and the silica-reactive compound.

In one embodiment, the silica-reactive compound includes a silica-reactive functional group, i.e. a group or moiety that will react with silica to form an ionic or covalent bond. Functional groups that react with silica typically include electron donors or are capable of reacting with a proton. Exemplary groups include alkoxysilyl, hydroxyl, polyalkylene glycol, silyl halide, and epoxy groups. Silica-reactive compounds containing one or more of these functional groups include functionalized elastomers, silica coupling agents, and silica-reactive dispersing aids.

In one embodiment, the alkoxysilyl functional group includes groups that can be represented by the formula

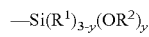

where each $R^1$ is independently a halogen or a monovalent organic group, each $R^2$ is independently a monovalent organic group, and y is an integer from 1 to 3. In one or more embodiments, the halogen is chlorine, bromine, iodine, or fluorine, and in one embodiment the halogen is chlorine. Monovalent organic groups include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups. In one or more embodiments, each monovalent organic group contains from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. In one embodiment, $R^2$ has from 1 to about 4 carbon atoms.

In one embodiment, the silica-reactive compound is a functionalized elastomer that contains a silica-reactive functional group, and these polymers can be represented by the formula

 A where  is an elastomeric polymer and A is a silica-reactive functional group.

The elastomer having a silica-reactive functional group attached thereto may include any elastomer conventionally employed in vulcanizable elastomeric compositions. Rubbery elastomers include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), and mixtures thereof. These elastomers can have a myriad of macromolecular structures including linear, branched and star shaped. In one embodiment, the elastomer includes homopolymers or copolymers of conjugated $C_4$-$C_{12}$ dienes, $C_8$-$C_{18}$ monovinyl aromatic monomers, and $C_6$-$C_{20}$ trienes. In another embodiment, the elastomer includes a copolymer of styrene and butadiene.

In one embodiment, where A is an alkoxysilyl functional group, the functionalized elastomer can be represented by the formula

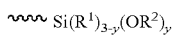 $Si(R^1)_{3-y}(OR^2)_y$ where 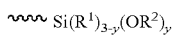 is an elastomeric polymer, and each $R^1$ and $R^2$ and y are as described above.

The alkoxysilyl-functionalized elastomer may be prepared by initiating polymerization with an alkoxysilyl-containing initiator. In a preferred embodiment, the alkoxysilyl-functionalized elastomer is prepared by reacting a living polymer chain with a siloxane terminating agent. Preparation of living polymer is well-known. Anionically polymerized diene polymers and copolymers containing functional groups derived from alkoxysilyl terminating agents are further described in U.S. Pat. Nos. 6,008,295 and 6,228,908, and U.S. Provisional Application No. 60/565,723, which are incorporated herein by reference. In one or more embodiment, the alkoxysilyl terminating agents include tetraethyl orthosilicate. In one embodiment, the alkoxysilyl-functionalized elastomer includes copolymers of styrene and butadiene that are terminated with tetraethyl orthosilicate.

The elastomer having a silica-reactive epoxy group may include epoxidized rubber. Epoxidized rubber is a modified rubber where some of the rubber's unsaturation is replaced by epoxide groups. Epoxidized rubber is further described in co-pending U.S. application Ser. No. 10/269,445, which is incorporated herein by reference.

In one embodiment, the silica-reactive compound is a silica coupling agent. In general, silica coupling agents include a silica-reactive functional group and a moiety (e.g., a mercapto, vinyl, or sulfur group) that will react or interact with the elastomer.

Silica coupling agents are further described in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 and 5,696,197, 6,608,145, and 6,667,362, which are incorporated herein by reference. Suitable silica coupling agents include an alkoxysilyl or silyl halide functional group. Examples of silica coupling agents include bis(trialkoxysilylorgano) polysulfides, mercaptosilanes, and blocked mercaptosilanes.

Bis(trialkoxysilylorgano)polysulfides include bis(trialkoxysilylorgano) disulfides and bis(trialkoxysilylorgano) tetrasulfides. Examples of bis(trialkoxysilylorgano) disulfides include 3,3'-bis (triethoxysilylpropyl) disulfide, 3,3'-bis (trimethoxysilylpropyl) disulfide, 3,3'-bis(tributoxysilylpropyl) disulfide, 3,3'-bis (tri-t-butoxysilylpropyl) disulfide, 3,3'-bis (trihexoxysilylpropyl) disulfide, 2,2'-bis (dimethylmethoxysilylethyl) disulfide, 3,3'-bis (diphenylcyclohexoxysilylpropyl) disulfide, 3,3'-bis(ethyl-di-sec-butoxysilylpropyl) disulfide, 3,3'-bis (propyldiethoxysilylpropyl) disulfide, 3,3'-bis (triisopropoxysilylpropyl) disulfide, 3,3'-bis (dimethoxyphenylsilyl-2-methylpropyl) disulfide, and mixtures thereof.

Examples of bis(trialkoxysilylorgano) tetrasulfide silica coupling agents include bis(3-triethoxysilylpropyl) tetrasulfide, bis(2-triethoxysilylethyl) tetrasulfide, bis(3-trimethoxysilylpropyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N, N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl) tetrasulfide is sold commercially as Si69 by Degussa.

In one embodiment, mercaptosilanes include compounds represented by the formula

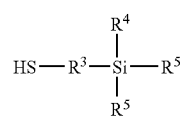

where $R^3$ is a divalent organic group or a bond, $R^4$ is a halogen atom or an alkoxy group, and each $R^5$ is independently a halogen, an alkoxy group, or a monovalent organic group. In one embodiment, at least one of $R^4$ and $R^5$ is an alkoxy group, and in another embodiment $R^4$ and each $R^5$ includes an alkoxy group. In certain embodiments, the alkoxy group has from 1 to 4 carbon atoms. In one embodiment, the divalent organic group is an alkylene group containing from 1 to about 4 carbon atoms. In certain embodiments, the halogen is chlorine, bromine, iodine, or fluorine, and in one embodiment the halogen is chlorine.

Monovalent organic groups include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups. In one embodiment, each group contains from 1 carbon atom, or the appropriate minimum number of carbon atoms to form the group, up to 30 carbon atoms. These hydrocarbyl groups may contain heteroatoms such as, but not limited to, nitrogen, oxygen, silicon, sulfur, and phosphorus atoms.

Examples of mercaptosilanes include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Mercaptosilanes also include blocked mercaptosilane compounds when used in conjunction with a deblocking agent. Blocked mercaptosilanes include sulfur-containing silanes where a sulfur atom is bonded to a silyl group, perhaps through a linking moiety, and the sulfur atom is also bonded to a blocking group. During processing, the blocking group is removed to form a mercaptosilane that is capable of acting as a coupling agent. An example of a simple blocked mercaptosilane can be represented by the formula

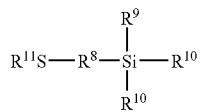

where $R^8$, $R^9$ and $R^{10}$ are as described above, and $R^{11}$ is a blocking group that will come off during processing leaving the S group to react with the polymer. In one embodiment, $R^{11}$ contains an unsaturated heteroatom or carbon chemically bound directly to S via a single bond, and is optionally substituted with one or more carboxylate ester or carboxylic acid functional groups. In one embodiment, $R^{11}$ is a carboxy group having from 1 to about 18 carbon atoms. Blocked mercaptosilanes are further described in U.S. Pat. No. 6,579,949 and U.S. Pat. No. 6,683,135, which are incorporated herein by reference.

Examples of blocked mercaptosilanes include 2-triethoxysilyl-1-ethyl thioacetate, 2-trimethoxysilyl-1-ethyl thioacetate, 2-(methyldimethoxysilyl)-1-ethyl thioacetate, 3-trimethoxysilyl-1-propyl thioacetate, triethoxysilylmethyl thioacetate, trimethoxysilylmethyl thioacetate, triisopropoxysilylmethyl thioacetate, methyldiethoxysilylmethyl thioacetate, methyldimethoxysilylmethyl thioacetate, methyldiisopropoxysilylmethyl thioacetate, dimethylethoxysilylmethyl thioacetate, dimethylmethoxysilylmethyl thioacetate, dimethylisopropoxysilylmethyl thioacetate, 2-triisopropoxysilyl-1-ethyl thioacetate, 2-(methyldiethoxysilyl)-1-ethyl thioacetate, 2-(methyldiisopropoxysilyl)-1-ethyl thioacetate, 2-(dimethylethoxysilyl)-1-ethyl thioacetate, 2-(dimethylmethoxysilyl)-1-ethyl thioacetate, 2-(dimethylisopropoxysilyl)-1-ethyl thioacetate, 3-triethoxysilyl-1-propyl thioacetate, 3-triisopropoxysilyl-1-propyl thioacetate, 3-methyldiethoxysilyl-1-propyl thioacetate, 3-methyldimethoxysilyl-1-propyl thioacetate, 3-methyldiisopropoxysilyl-1-propyl thioacetate, 1-(2-triethoxysilyl-1-ethyl)-4-thioacetylcyclohexane, 1-(2-triethoxysilyl-1-ethyl)-3-thioacetylcyclohexane, 2-triethoxysilyl-5-thioacetylnorbornene, 2-triethoxysilyl-4-thioacetylnorbornene, 2-(2-triethoxysilyl-1-ethyl)-5-thioacetylnorbornene, 2-(2-triethoxysilyl-1-ethyl)-4-thioacetylnorbornene, 1-(1-oxo-2-thia-5-triethoxysilylpenyl)benzoic acid, 6-triethoxysilyl-1-hexyl thioacetate, 1-triethoxysilyl-5-hexyl thioacetate, 8-triethoxysilyl-1-octyl thioacetate, 1-triethoxysilyl-7-octyl thioacetate, 6-triethoxysilyl-1-hexyl thioacetate, 1-triethoxysilyl-5-octyl thioacetate, 8-trimethoxysilyl-1-octyl thioacetate, 1-trimethoxysilyl-7-octyl thioacetate, 10-triethoxysilyl-1-decyl thioacetate, 1-triethoxysilyl-9-decyl thioacetate, 1-triethoxysilyl-2-butyl thioacetate, 1-triethoxysilyl-3-butyl thioacetate, 1-triethoxysilyl-3-methyl-2-butyl thioacetate, 1-triethoxysilyl-3-methyl-3-butyl thioacetate, 3-trimethoxysilyl-1-propyl thiooctanoate, 3-triethoxysilyl-1-propyl thiopalmitate, 3-triethoxysilyl-1-propyl thiooctanoate, 3-triethoxysilyl-1-propyl thiobenzoate, 3-triethoxysilyl-1-propyl thio-2-ethylhexanoate, 3-methyldiacetoxysilyl-1-propyl thioacetate, 3-triacetoxysilyl-1-propyl thioacetate, 2-methyldiacetoxysilyl-1-ethyl thioacetate, 2-triacetoxysilyl-1-ethyl thioacetate, 1-methyldiacetoxysilyl-1-ethyl thioacetate, 1-triacetoxysilyl-1-ethyl thioacetate. Blocked mercaptosilanes are commercially available from GE Silicones-OSi Specialties as NXT® silanes.

Blocked mercaptosilanes may be used in conjunction with a deblocking agent. In certain embodiments, deblocking agents can function as a proton source and a blocking group acceptor. When reaction of the mixture to couple the filler to the polymer is desired, a deblocking agent may be added to the mixture to deblock the blocked mercaptosilane. Deblocking agents include ethylene glycol, polyethylene glycols, propylene glycol, polypropylene glycols, mixed ethylene-propylene glycols, alkyl-terminated glycols, glycerol, trimethylol alkanes, pentaerythritol, phenol, catechol, and mixtures thereof. In one embodiment, deblocking agents include glycerol, trimethylol propane, and ethylene glycol. In certain embodiments, the deblocking agent may be added at quantities ranging from about 0.1 to about 5 parts per hundred rubber (phr), in one embodiment, in the range of from about 0.5 to about 3 phr. Deblocking is further described in U.S. Pat. No. 6,579,949 and U.S. Pat. No. 6,683,135, which are incorporated herein by reference.

If a silica coupling agent is present, the silica coupling agent may be added in an amount of from about 0.01 to about 25 percent based on the weight of the silica, in one embodiment from about 0.5 to about 15 percent based on the weight of the silica, and in another embodiment from about 1 to about 10 percent based on the weight of the silica. In one embodiment, where silica-reactive functionalized elastomer is employed, the amount of silica coupling agent may be reduced, when compared to conventional methods.

In one embodiment, the silica-reactive compound is a silica reactive dispersing agent. Silica reactive dispersing agents include a silica-reactive functional group, but differ from silica coupling agents in that silica reactive dispersing agents generally are not reactive with the elastomer.

Examples of silica reactive dispersing agents include glycols and alkyl alkoxysilanes. In certain embodiments, such silica reactive dispersing agents can be used to replace all or part of the silica coupling agents, while improving the processability of silica-filled rubber compounds by reducing the compound viscosity, increasing the scorch time, and reducing silica reagglomeration. Specific examples of glycols include diethylene glycol or polyethylene glycol.

Alkyl alkoxysilanes include an alkoxysilyl functional group and can be described by the formula

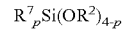

where each $R^2$ is independently as described above, each $R^7$ is independently a monovalent organic group, and p is an integer from 1 to 3, with the proviso that at least one $R^7$ is an alkyl group. In one embodiment, p is 1.

Examples of alkyl alkoxysilanes include octyl triethoxysilane, octyl trimethoxysilane, cyclohexyl triethoxysilane, isobutyl triethoxysilane, cyclohexyl tributoxysilane, dimethyl diethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane.

In one embodiment, a useful amount of these optional silica reactive dispersing aids is from about 0.1 to about 25 percent based on the weight of the silica, in another embodiment, from about 0.5 to about 20 percent based on the weight of the silica, and in another embodiment from about 1 to about 15 percent based on the weight of the silica.

Strong acids include Bronsted acids and Lewis acids. In one embodiment, the acid is a non-oxidizing acids. Examples of strong acids include mineral acids and organic acids. Mineral acids include hydrochloric acid, phosphoric acid, and sulfuric acid.

Organic acids, typically of the Bronsted type, include sulfonic acids, benzoic acids, organophosphorus acids, propionic acids, phthalic acids, butyric acids, acetic acids, and other organic acids.

Sulfonic acids include 1-acetylamino-2-naphthol-3-6 disulphonic acid, aminobenzene-sulphonic acid, 2-amino-8-naphthol-6-sulphonic acid, aminonitrophenol sulphonic acid, aminophenol-sulphonic acid, aniline-2,5-disulphonic acid, 2-amino-1-benzoic-5-sulphonic acid, naphthalene 1,5-disulphonic acid, benzenesulphonic acid, benzidine 2,2-disulphonic acid, butyl-naphthalene sulphonic acid, 2-naphthylamine-4,8 disulphonic acid, 1-amino-8-naphthol-4-8 disulphonic acid, o-chloroaminophenol sulphonic acid, p-chloroaminophenol sulphonic acid, chlorosulphonic acid, 1-8-dihydroxy naphthalene-3-6-disulphonic acid, 1-naphthylamine-6-sulphonic acid, 1-naphthylamine-7-sulphonic acid, cresolsulphonic acid, 2-naphthol-8-sulphonic acid, dehydrothio-p-toluidine sulphonic acid, o-dichlorobenzene sulphonic acid, 4,4-dinitrostilbene-2,2-disulphonic acid, diphenylaminosulphonic acid, dodecylbenzenesulphonic acid, ethyl-benzyl aniline sulphonic acid, 1-naphthylamine-3-6-disulphonic acid, g-acid/2-naphthol-6,8-disulphonic acid, 1-amino-8-naphthol-3-6-disulphonic acid, 8-hydroxyquinoline-5-sulphonic acid, 7-iodo-8-hydroxyquinoline-5-sulphonic acid, 2-amino-5-naphthol-7-sulphonic acid, n-phenyl-2-amino-5-naphthol-7-sulphonic acid, 1-naphthol-5-sulphonic acid, 1-naphthylamine-5-sulphonic acid, methane sulphonic acid, naphthalene sulphonic acid, beta-naphthalene sulphonic acid, 1-naphthol-4-sulphonic acid, p-nitroaniline sulphonic acid, m-nitrobenzenesulphonic acid, p-nitrochlorobenzene sulphonic acid, p-nitrotoluene sulphonic acid, 4,4'-diamino-diphenylanimo-2-sulphonic acid, 1-naphthylamine-8-sulphonic acid, phenolsulphonic acid, n-phenyl-2-amino-8-naphthol-6-sulphonic acid, phenylhydrazine-sulphonic acid, phenyl-1-naphthylamine-8-sulphonic acid, primuline sulphonic acids, 2-naphthol-3-6 disulphonic acid, 2-amino-8-naphthol-3-6-disulphonic acid, 2-naphthol-6-sulphonic acid, benzene sulphonic acid, toluene sulphonic acid (TSA), 1-tolylamine-naphthalene-8-sulphonic acid, and xylene sulphonic acid. In one embodiment, the sulfonic acid includes toluene sulfonic acid.

Benzoic acids include o-aminobenzoic acid, m-aminobenzoic acid, p-aminobenzoic acid, sulphobenzoic acid, sulphonitrobenzoic acid, o-iodobenzoic acid, p-tert-butylbenzoic acid, o-chlorobenzoic acid, 2,3-dihydrobenzoic acid, 2,3-dimethoxybenzoic acid, gallic acid/trihydroxybenzoic acid, p-hydroxybenzoic acid, nitrobenzoic acids, and 2,3,4-trimethoxybenzoic acid.

Organophosphorus acids include amylphosphoric acid, butylphosphoric acid, ethylhexylphosphoric acid, dodecylphosphoric acid/lauryl-phosphoric acid, glycerophosphoric acid, and tridecylphosphoric acid.

Propionic acids include bromopropionic acid, chloropropionic acid, 2-(2,4-dichlorophenoxy)propionic acid, methyl chlorophenoxy-propionic acid, phenylpropionic acid, beta-phenylpropionic acid, propionic acid, and tryptophan/amino indolpropionic acid.

Phthalic acids include hexahydrophthalic acid, isophthalic acid, monoperphthalic acid, phthalic acid, terephthalic acid, and tetrahydrophthalic acid.

Butyric acids include aminobutyric acid, n-bromobutyric acid, butyric acid, indolebutyric acid, isobutyric acid, and aminohydroxybutyric acid.

Acetic acids include acetic acid, phenylethylacetic acid, naphthylacetic acid, methylnaphtylacetic acid, bromoacetic acidsmonochloroacetic acid, dichloracetic acid, trichloroacetic acid (tca), cyanoacetic acid, diethylacetic acid, diphenylacetic acid, ethylenediamine tetra acetic acid, aminoacetic acid, hydroxyacetic acid, methylaminoacetic acid, theophylline acetic acid, phenylacetic acid, 2,4,5-trichlorophenoxyacetic acid, and thioacetic acid.

Other organic acids include acetylaminophenyl arsinic acid, acrylic acid, adenylic acid, adipic acid, alanine/2-aminopropanoic acid, alginic acid, aminoundecanoic acid, azelaic acid, behenic acid, benzilic acid, cacodylic acid, n-caproic acid, caprylic acid, p-chloro-o-metanilic acid, chrysophanic acid, 2,3-dimethoxylcinnamic acid, cresotic acids, cresylic acid, crotonic acid, 1,4-cyclohexane-dicarboxylic acid, cyclo-oxylic acid, cyanuric acid, deoxycholic acid, decanoic acid, p-dichlorosulphanilic acid, diphenolic acid, dodecanedioic acid, pure, erucic acid, formic acid, fumaric acid, furoic acid, gluconic acid, glutamic acid, glycyrrhetinic acid, glycyrrhizinic acid, n-heptanoic acid, homoveratric acid, hydrocyanic acid, hydrofluosilicic acid, beta-hydroxy-naphthoic acid, hydroxynitrophenyl arsinic acid, 12-hydroxystearic acid, isocyanuric acid, isovalerianic acid, itaconic acid, lactic acid, lauric acid, aminoisocaproic acid, levulinic acid, linoleic acid, n-heptadecanoic acid, maleic acid, malic acid, malonic acid, mandelic acid, methacrylic acid, methylarsenic acid, methyl-phenyl-piperidine-carbonic acid, methylenecitric acid, monoiodosalycilic acid, mucochloric acid, myristic acid, naphthalene-carbonic acids, naphthenic acid, naphthionic acid, nicotinic acids, isonicotinic acid, oleic acid, orotic acid, oxalic acid, oxolinic acid, palmitic acid, pelargonic acid, peracetic acid, phenylquinoline-carbonic acid, phytic acid, picric acid, pimelic acid, pivalic acid, 2-pyrrolidine carboxylic acid, propion cyclohexyl acid, protocatechuic acid, pyrogallic acid, pyromellitic acid, ricinoleic acid, salicylic acid, sulphosalicylic acid, sebacic acid, sorbic acid, stearic acid, isostearic acid, suberic acid, succinic acid, sulphanilic acid, syringic acid, tannic acid, tartaric acid, tartaric racemic acid, m-tartaric acid, thioglycolic acid, thiophenecarboxylic acid, thiosalicylic acid, toluic acid, p-toluic acid, trichlorophenic acid, trimellitic acid, trimethyladipic acid, undecylenic acid, undecylic acid, uric acid, valeric acid, aminoisovaleric acid, and yohimbic acid.

Lewis acids are generally defined as electron pair acceptors and include metal cations and covalent compounds of metals. Examples of Lewis acids include aluminum chloride, boron trifluoride, antimony pentachloride, antimony pentafluoride, iron (III) chloride, tin tetrachloride, tin tetrafluoride, and zinc chloride. When employed, Lewis acids may be used in conjunction with a protic co-agent such as water or alcohol.

Strong acids are believed to advantageously enhance the reaction between silica particles and a silica-reactive compound. Weaker acids will also enhance the reaction, but the reaction may be slower. One indicator of relative acid strength is Bronsted acidity, or $pK_a$. The $pK_a$ is the negative logarithm (to the base 10) of the acid dissociation constant $K_a$ of the acid. The acid dissociation constant of compound HA is the equilibrium constant of the dissociation of HA in water and may be calculated according to the formula $$K_a = [H^+][A^-]/[HA]$$

where $[H^+]$ is the molar concentration of hydronium ion, $[A^-]$ is the molar concentration of anion $A^-$, and $[HA]$ is the molar concentration of the undissociated compound HA. Various parameters such as temperature and solvent can affect $pK_a$ measurements. However, the relative strength of various acids can be described by $pK_a$ measurements that are performed under standardized, i.e. substantially identical, conditions. Stronger acids have smaller or more negative $pK_a$ values than weaker acids.

In one embodiment, the strong acid has a relative acid strength equal to or greater than acetic acid, as indicated by a $pK_a$ value equal to or less than the $pK_a$ of acetic acid when measured under substantially identical conditions.

For example, the $pK_a$ of acetic acid in dilute aqueous solution at 25° C. is 4.76. In one embodiment, the $pK_a$ of the acid under these standardized conditions, is equal to or less than about 4.76, in another embodiment less than about 4, in yet another embodiment less than about 3, in still yet another embodiment, less than about 2. In one embodiment, the strong acid has a $pK_a$ of from about −3 to about 3, in another embodiment from about −2 to about 2, when measured in dilute aqueous solution at 25° C.

Strong acids also include those acids whose $pK_a$ is typically measured in dimethyl sulfoxide (DMSO) rather than water. In one embodiment, strong acids have a DMSO $pK_a$ of equal to or less than about 5, in another embodiment less than about 4.7, in yet another embodiment less than about 4, in still another embodiment, less than about 3. In one embodiment, the strong acid has a $pK_a$ of from about −3 to about 3, in another embodiment from about −2 to about 2, when measured in DMSO at 25° C.

The amount of strong acid is not particularly limited, but in one embodiment is from about 0.001 to about 8 parts by weight per hundred parts silica, in another embodiment from about 0.005 to about 5 parts by weight parts by weight per hundred parts silica, in yet another embodiment from about 0.05 to about 4 and in still anther embodiment from about 0.1 to about 2 parts by weight per hundred parts silica.

Useful silica (silicon dioxide) includes wet-process, hydrated silica produced by a chemical reaction in water, and precipitated as ultra-fine spherical particles. In one embodiment, silicas have a surface area, as measured by the BET method, of about 32 to about 400 $m^2/g$, in another embodiment about 100 to about 250 $m^2/g$, and in yet another embodiment about 150 to about 220 $m^2/g$. In certain embodiments the pH of the silica filler is about 5.5 to about 7 and preferably about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ S/kg (Bary AG), Ultrasil™ VN2, VN3 (Degussa), and HuberSil™ 8745 (Huber).

In one or more embodiments, silica may be used in an amount from about 5 to about 100 parts by weight phr, in one embodiment from about 10 to about 90 parts by weight phr, in another embodiment from about 15 to about 85 parts by weight phr, and in yet another embodiment from about 25 to about 75 parts by weight phr.

Other ingredients that may be employed in the vulcanizable elastomeric compositions and vulcanizates include additional filler, processing aids, additional rubbery polymers, cure agents and accelerators.

Other fillers that may be used include carbon black, alumina, aluminum hydroxide, magnesium hydroxide, clays (hydrated aluminum silicates), and starch. In one embodiment, the total amount of filler employed is typically from about 1 to about 100 phr, in another embodiment, from about 20 to about 90 parts by weight phr, and in yet another embodiment, from about 40 to about 80 parts by weight phr.

Useful carbon black includes any commonly available carbon black. In one embodiment, the carbon black has a surface area (EMSA) of at least 20 $m^2/g$, and in another embodiment, the surface area is at least 35 $m^2/g$ up to 200 $m^2/g$ or higher. Surface area values used in this application are those determined by ASTM test D-1765 by using the cetyltrimethyl-ammonium bromide (CTAB) technique.

Carbon black can also be used to support any of the silica reactive dispersing aids, acids, and silica coupling agents described above. If desired, carbon black may be used in an amount from about 0.5 to about 70 parts by weight phr, in one embodiment, from about 1 to about 50 parts by weight phr, and in another embodiment from about 2 to about 40 parts by weight phr.

The term processing aids commonly includes a broad category of substances that improve various aspects of the process of forming vulcanizable compositions and vulcanizates. For example, processing aids may prevent filler agglomeration and reduce viscosity. Silica processing aids may operate via physically coating the silica particle, or may interact with the silica particle via through-space interaction (e.g., hydrogen bonding, van der Waals interaction, etc.). The silica processing aids shield the silanol groups on the surface of the silica particles, to prevent reagglomeration or flocculation of the silica particles. Examples of processing aids include fatty acid esters of hydrogenated and non-hydrogenated $C_5$ and $C_6$ sugars, polyoxyethylene derivatives of fatty acid esters, amines, oils, mineral fillers, and non-mineral fillers.

Examples of fatty acid esters of hydrogenated and non-hydrogenated $C_5$ and $C_6$ sugars (e.g., sorbose, mannose, and arabinose) that are useful as silica processing aids include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan include the sorbitan monooleates known as Alkamul® SMO, Capmul® O, Glycomul® O, Arlacel® 80, Emsorb® 2500, and S-Maz® 80. When used with bis (trialkoxysilylorgano) polysulfide silica coupling agents, these fatty acid esters are present in one embodiment in an amount of from about 0.1% to about 25% by weight based on the weight of the silica, in another embodiment from about 0.5% to about 20% by weight of silica, and in yet another embodiment from about 1% to about 15% by weight based on the weight of silica.

Examples of polyoxyethylene derivatives of fatty acid esters of hydrogenated and non-hydrogenated $C_5$ and $C_6$ sugars include polysorbates and polyoxyethylene sorbitan esters, which are analogous to the fatty acid esters of hydrogenated and non-hydrogenated sugars noted above except that ethylene oxide groups are placed on each of the hydroxyl groups. Commercially available polyoxyethylene derivatives of sorbitan include POE® (20) sorbitan monooleate, Polysorbate® 80, Tween® 80, Emsorb® 6900, Liposorb® O-20, and T-Maz® 80. The Tween®® products are commercially available from ICI Specialty Chemicals. In one embodiment, the amount of these optional silica shielding aids is from about 0.1% to about 25% by weight based on the weight of the silica, in another embodiment from about 0.5% to about 20% by weight, in yet another embodiment from about 1% to about 15% by weight based on the weight of the silica.

Certain additional fillers can be utilized as processing aids, including clay (hydrous aluminum silicate), talc (hydrous magnesium silicate), aluminum hydrate [$Al(OH)_3$], mica, and sodium sulfate. In certain embodiments, the mica principally contains alumina and silica. In one embodiment, one or more of these fillers are present in the amount of from about 0.5 to about 40 phr, in another embodiment in an amount of about 1 to about 20 phr, and in yet another embodiment in an amount of about 1 to about 10 phr. These additional fillers can also be used as carriers to support any of the silica reactive dispersing aids, acids, and silica coupling agents described above.

To the extent that these processing aids contain a hydroxy group that is reactive toward the silica particles, the strong acid may act to enhance this reaction.

One or more additional elastomers, sometimes called rubbery elastomers or rubbery polymers, may be employed. Rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. In one embodiment, the elastomer includes homopolymers or copolymers of conjugated $C_4$-$C_{12}$ dienes, $C_8$-$C_{18}$ monovinyl aromatic monomers, and $C_6$-$C_{20}$ trienes.

In one embodiment, from about 5 to about 100 percent of the total elastomer molecules are functionalized with the silica-reactive functional group. In another embodiment, from about 10 to about 90 percent and in yet another embodiment from about 20 to about 80 percent of the total elastomer molecules are functionalized with the silica-reactive functional group.

A multitude of rubber curing agents may be employed, including sulfur or peroxide-based curing systems. Curing agents are described in Kirk-Othmer, *Encyclopedia of Chemical Technology*, Vol. 20, pp. 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering*, (2$^{nd}$ Ed. 1989), which are incorporated herein by reference. Vulcanizing agents may be used alone or in combination.

The vulcanization accelerators are not particularly limited. Examples include thiazoles, dithiocarbamates, dithiophosphates, guanidines, sulfenamides, sulfenimides, and thiurams. Specific examples include 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine. In one embodiment, the amount of accelerator is preferably from about 0.1 to about 5 phr, and in another embodiment from about 0.2 to about 3 phr.

Oils, waxes, scorch inhibiting agents, tackifying resins, reinforcing resins, fatty acids, peptizers, and zinc oxide may also be employed.

The present invention provides a method for forming a mixture of ingredients including a silica particle, a silica-reactive compound, and a strong acid. The order in which the silica particle, silica-reactive compound and strong acid are added can vary within the scope of the invention, however increased interaction between the silica particle and silica-reactive compound is believed to occur when the silica particle and the silica-reactive compound are combined in the presence of the strong acid.

In one embodiment, the mixture is a vulcanizable rubber composition, such as a tire formulation. It is known that within tire formulations, hydrolytic bonding can occur between silica particles, causing agglomeration, or between functional groups of a functionalized elastomer. It is believed that the strong acid aids in breaking these hydrolytic bonds, allowing increased interaction between the particle and the elastomer. When the strong acid is mixed with just the functionalized elastomer however, it is believed that the hydrolytic bonds of the functionalized elastomer break, but then may re-form if there is no silica particle to interact with. Likewise, when the strong acid is mixed with just the silica particles, it is believed that the hydrolytic bonds of the silic particles break, but then may re-form if there is no silica reactive compound to interact with. In one embodiment, therefore, the strong acid is added to a mixture containing a silica particle and silica-reactive compound.

Generally, tire formulations are prepared by a multi-step process. For example, multiple mixing steps are typically employed when preparing silica-filled rubber compositions, as described in U.S. Pat. Nos. 5,227,425, 5,719,207, 5,717,022, as well as European Patent No. 890,606, all of which are incorporated herein by reference.

The vulcanizable rubber composition may be prepared by forming an initial masterbatch composition that includes elastomer, silica, and optionally other ingredients. To prevent premature vulcanization, this initial composition generally excludes any vulcanizing agents. One or more of the ingredients may be added in increments.

Once the initial masterbatch composition is processed, the vulcanizing agents may be introduced and blended into the initial masterbatch to form a final mix. Additional ingredients, such as accelerators, may be added to the final mix during this stage. The final mix is preferably prepared at low temperatures that do not initiate the vulcanization process.

Optionally, additional mixing stages can be employed between the initial mix stage and the final mix stage. Additional mixing stages where no additional ingredients are added can be referred to as remill stages, while mixing stages where ingredients are added are called masterbatch stages, and can be further denoted by ordinal designations, such as second masterbatch and so on.

One or more ingredients may be premixed with a carrier. Suitable carriers include any material that is not deleterious to the mixture. Examples include stearic acid, mineral oil, plastics, wax and organic solvents. In certain embodiments, the strong acid is combined with a carrier to form a premix. In one embodiment, the premix contains from about 1 part by weight heterocycle per 3 parts by weight carrier to about 1 part by weight heterocycle per 1 part by weight carrier.

In one embodiment, the initial masterbatch composition includes a silica-reactive functionalized elastomer, silica, a strong acid, and optionally other ingredients including additional elastomer and carbon black.

Silica coupling agents and silica reactive dispersing agents are optional ingredients, and may be added as part of the initial composition, or may be added to the initial composition during an additional masterbatch step. In one embodiment, the strong acid is added prior to or at the same time as the silica coupling agent or silica reactive dispersing agent.

Two types of temperatures will be referred to herein. One type, the mixer temperature, refers to the stabilized temperature of the mixing equipment prior to addition of the ingredients. The second type refers to the surface temperature of the composition. Unless specifically referred to as the mixer temperature, any reference to temperature in this specification should be understood to mean the surface temperature of the composition.

In one embodiment, the initial mixer temperature for the initial masterbatch mixing step, and any subsequent masterbatch mixing steps, is from about 25° C. to about 140° C., and in another embodiment from about 70° C. to about 120° C. In certain embodiments, the mixing conditions may be controlled to maintain the surface temperature of the composition within the range of about 25° C. to about 195° C., in one embodiment about 100° C. to about 185° C., and in another embodiment about 135° C. to about 165° C. during mixing. These mixing conditions are maintained for the amount of time necessary to achieve good dispersion of the filler within the rubber. One of ordinary skill in the art will appreciate that the necessary amount of time will vary depending upon such factors as mixer size, sheer, temperature, and the like.

In between each mixing stage, the mixed composition may be cooled to a surface temperature below the intended temperature for the next mixing step. This may be accomplished by discharging the mixed composition, cooling, and re-charging the same mixer apparatus or transferring the composition to another mixer. Alternatively, the mixed composition may be cooled within the mixer.

In one embodiment the mixing conditions may be controlled to achieve a surface temperature of the composition within the range of about 70° C. to about 175° C., in another embodiment about 135° C. to about 165° C. and in yet another embodiment about 140° C. to about 160° C. These mixing conditions are maintained for the amount of time necessary to reduce the viscosity and improve the dispersion of the filler within the rubber. One of ordinary skill in the art will appreciate that the necessary amount of time will vary depending upon such factors as mixer size, sheer, temperature, and the like. A remill step may be performed in the same mixer used for the masterbatches, or the mixture may be transferred to another mixer.

The final mixing stage, during which the cure agents and accelerators are added, is performed at a temperature below the vulcanization temperature. In one embodiment, the mixing conditions may be controlled to achieve a surface temperature of the composition within the range of about 40° C. to about 120° C., in another embodiment about 60° C. to about 110° C., and in yet another embodiment about 75° C. to about 100° C. These conditions are maintained for the amount of time necessary to achieve good mixing.

The method of this invention is particularly useful in preparing tire components such as treads, subtreads, black sidewalls, body ply skins, bead filler, and the like. The construction and curing of the tire is not affected by the practice of this invention. Rubber compounding techniques and the additives employed therein are further described in Stephens, *The Compounding and Vulcanization of Rubber*, in *Rubber Technology* (2$^{nd}$ Ed. 1973).

Where the vulcanizable rubber compositions are employed in the manufacture of tires, these compositions can be processed into tire components according to ordinary tire manufacturing techniques including standard rubber shaping, molding and curing techniques. Pneumatic tires can be made as discussed in U.S. Pat. Nos. 5,866,171, 5,876, 527, 5,931,211, and 5,971,046, which are incorporated herein by reference.

In certain embodiments, the tire compositions of this invention advantageously have improved rubber compound reinforcement, which is believed to be caused by increased polymer-filler interaction, which results in improved rolling resistance, reduced wear, and improved wet traction. Excellent polymer processability is maintained. These tire compositions can be readily prepared by the subject method.

In order to demonstrate the practice of the present invention, the following examples have been prepared and tested. The examples should not, however, be viewed as limiting the scope of the invention. The claims will serve to define the invention.

EXAMPLES

Synthesis of Trialkoxysilyl-Functionalized SBR Polymer

Trialkoxyslyl-functionalized SBR polymer was prepared by conventional anionic semi-batch polymerization using n-butyllithium as an initiator along with t-amylate or ditetrahydrofurylpropane, and tetraethyl orthosilicate as a terminator. Sorbitan trioleate and 2-ethylhexanoic acid were added and the polymer was stabilized with 2,6-di-t-butyl-p-cresol. The polymer was coagulated and drum dried. NMR analysis of this base polymer indicated a styrene content of about 34 percent and approximately 17 percent of the butadiene in the 1,2-configuration. The polymer was characterized as shown in Table I.

TABLE I

| | |
|---|---|
| $M_w$ (kg/mol) | 243 |
| $M_n/M_w$ (kg/mol) | 1.24 |
| Styrene in SBR (%) | 35 |
| Vinyl in SBR (%) | 18 |
| $T_g$ (° C.) | −44 |

Examples 1-2

Preparation of Vulcanizable Elastomeric Composition

The trialkoxysilyl-functionalized SBR polymer was employed in carbon black/silica tire formulations. The formulations are presented in Table II.

TABLE II

|  | Example No. | |
| --- | --- | --- |
|  | 1 | 2 |
| Initial (parts by weight) | | |
| Trialkoxysilyl-functionalized SBR | 68.0 | 68.0 |
| Butadiene Rubber | 33.0 | 33.0 |
| Carbon Black* | 35.0 | 35.0 |
| Silica | 30.0 | 30.0 |
| Wax | 1.5 | 1.5 |
| Antioxidant | 0.95 | 0.95 |
| Naphthenic Oil | 31.0 | 31.0 |
| Toluene Sulfonic Acid | 0 | 0.5 |
| Second (parts by weight) | | |
| Disulfane | 3.15 | 3.15 |
| Final (parts by weight) | | |
| Sulfur | 2.0 | 2.0 |
| Zinc Oxide | 1.7 | 1.7 |
| Antioxidant | 1.15 | 1.15 |
| Accelerators | 2.8 | 2.8 |
| Accelerators | 1.5 | 1.5 |

*SAF

Each carbon black/silica rubber compound was prepared in three stages named Initial Masterbatch, Second Masterbatch, and Final. In the initial masterbatch stage, alkoxysilyl-functionalized SBR and butadiene rubber were mixed with silica, carbon black, and other ingredients in a 300 g Banbury mixer operating at 60 RPM at an initial mixer temperature of about 99° C. Toluene sulfonic acid was present in the initial formulation for Example 2. The initial composition was mixed for 4 minutes. At the end of the mixing the surface temperature of the material was approximately 155° C. The samples were cooled to less than about 80° C. and transferred to a second mixer.

In the second masterbatch stage, the initial composition was mixed with disulfane at about 60 RPM. The starting temperature of the mixer was about 80° C. The second masterbatch material was removed from the mixer after about 2 minutes, when the surface temperature of the material was between 135 and 155° C.

The final composition was mixed by adding the second masterbatch composition, curative materials, and other ingredients as listed in Table II to the mixer simultaneously. The starting mixer temperature was 62° C. and it was operating at 60 RPM. The final composition was removed from the mixer after 1 minute, when the surface temperature of the material was about 93° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Tensile mechanical properties were measured using ASTM-D 412 at 25° C. Tensile tests were performed on ring-shaped and dumbbell-shaped samples. The ring samples were about 1.3 mm in width and 1.9 mm in thickness, and the gauge length was 2.54 cm.

The green stock Mooney viscosity measurements were taken at 130° C. The sample was preheated for 1 minute, a large rotor was started, and the torque was measured after 4 minutes of rotation. Mooney scorch measurements, specifically the time required for an increase of 5 Mooney units (T5) can indicate how fast the compound viscosity will increase during extrusion processes. Curing characteristics were measured using a Monsanto Rheometer MD2000, at a frequency of 1.67 Hz, 160° C., and a strain of 7%. MH and ML are the measured maximum and minimum torques, respectively. TS2 is the time required for the torque to reach 2% of the total torque increase during the curing process. T90 is the time required for the torque to reach 90% of the total torque increase during the curing process.

The Lambourn test was used to evaluate the wear resistance of the samples. Specifically, samples shaped like donuts with an inside diameter of about 2.86 cm, an outer diameter of about 4.83 cm, and a thickness of about 0.495 cm were placed on an axle and run at a slip ratio of 65% against a driven abrasive surface.

Dynamic properties were determined by using a Rheometrics Dynamic Analyzer (RDA). The tan δ was obtained from temperature sweep experiments conducted with a frequency of 31.4 rad/sec using 0.5% strain for temperatures ranging from −100° C. to −10° C., and with 2% strain for temperatures ranging from −10° C. to 100° C.

TABLE III

|  | 1 | 2 |
| --- | --- | --- |
| Ring Tensile Properties @ 25° C. | | |
| M @ 50% strain (MPa) | 1.62 | 1.59 |
| M @ 300% strain (MPa) | 9.97 | 10.15 |
| Tensile Strength @ break (MPa) | 19.48 | 20.36 |
| Elongation @ break (%) | 512 | 530 |
| Toughness (MPa) | 45.20 | 49.10 |
| Lambourn Wear Index | 100 | 100 |
| Ring Tensile Properties @ 100° C. | | |
| M @ 50% strain (MPa) | 1.11 | 1.15 |
| M @ 300% strain (MPa) | 7.79 | 8.17 |
| Tensile Strength @ break (MPa) | 9.92 | 11.62 |
| Elongation @ break (%) | 365 | 401 |
| Toughness (MPa) | 16.46 | 20.98 |
| Dumbbell Tensile @ 25° C. | | |
| M @ 50 (MPa) | 18.4 | 19.95 |
| M @ 300% strain (MPa) | 1.62 | 1.58 |
| Tensile Strength @ break (MPa) | 8.00 | 7.96 |
| Elongation @ break (%) | 660 | 713 |
| Toughness (MPa) | 59.7 | 69.91 |
| Dumbbell Tensile @ 100° C. | | |
| M @ 50 (MPa) | 9.72 | 10.65 |
| M @ 300% strain (MPa) | 1.50 | 1.40 |
| Tensile Strength @ break (MPa) | 6.94 | 6.90 |
| Elongation @ break (%) | 424 | 469 |
| Toughness (MPa) | 21.14 | 25.36 |
| Aged Tensile Properties @ 100° C. | | |
| M @ 50 (MPa) | 2.27 | 2.23 |
| M @ 300% strain (MPa) | 15.03 | 14.92 |
| Tensile Strength @ break (MPa) | 18.46 | 20.07 |
| Elongation @ break (%) | 363 | 396 |
| Toughness (MPa) | 31.52 | 37.81 |
| Green Stock Mooney & Curing Characteristics | | |
| Mooney @ 130° C. | 65.6 | 68.1 |
| T5 scorch @ 130° C. (sec) | 847 | 889 |
| TS2 @ 160° C. (min) | 2.90 | 2.73 |
| T90 @ 160° C. (min) | 5.56 | 5.04 |
| MH−ML | 16.35 | 16.67 |
| Dynamic Viscoelastic Properties | | |
| G' @−20° C. (MPa) | 4.6 | 4.3 |
| 0° C. tan δ | 0.3558 | 0.3682 |
| 50° C. tan δ | 0.2739 | 0.2690 |

Various modifications and alterations that do not depart from the scope and spirit of this invention will become apparent to those skilled in the art. This invention is not to be duly limited to the illustrative embodiments set forth herein.

What is claimed is:

1. A method for preparing a tire, the method comprising the steps of:
   mixing ingredients including silica and at least one elastomer to form a first mixture, where the elastomer optionally includes silica-reactive functionalized elastomer;
   cooling the first mixture;
   further mixing the first mixture, optionally with additional ingredients including a silica coupling agent and a silica reactive dispersing agent, to form an intermediate mixture, with the proviso that at least one of the ingredients mixed to form the first mixture or the additional ingredients added to form the intermediate composition includes a silica-reactive compound;
   adding ingredients including a curative to the intermediate mixture to form a vulcanizable mixture;
   mixing the vulcanizable mixture;
   forming the vulcanizable mixture into a tire component;
   building a tire by including the tire component;
   curing the tire; where a strong acid is added to at least one of said step of mixing ingredients to form a first mixture or said step of further mixing to form an intermediate mixture.

2. The method of claim 1, where the silica-reactive compound includes an alkoxysilyl, hydroxyl, polyalkylene glycol, silyl halide, or epoxy functional group.

3. The method of claim 2, where the silica-reactive compound includes an alkoxysilyl substituent defined by the formula

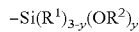
$-Si(R^1)_{3-y}(OR^2)_y$ where each $R^1$ is independently a halogen atom or a monovalent organic group, each $R^2$ is independently a monovalent organic group, and y is an integer from 1 to 4.

4. The method of claim 1, where the strong acid is an organic acid.

5. The method of claim 4, where the strong acid is a sulfonic acid.

6. The method of claim 1, where the strong acid has a $pK_a$ in dilute aqueous solution at about 25° C. of less than about 4.

7. The method of claim 1, where the strong acid has a $pK_a$ in dilute aqueous solution at about 25° C. of less than about 3.

8. The method of claim 1, where the strong acid has a $pK_a$ in dilute aqueous solution at about 25° C. of less than about 2.

9. The method of claim 1, where the silica-reactive compound is a functionalized elastomer and where the elastomer is a homopolymer or copolymer of conjugated $C_4$-$C_{12}$ dienes, $C_8$-$C_{18}$ monovinyl aromatic monomers, and $C_6$-$C_{20}$ trienes.

10. The method of claim 1, where the vulcanizable mixture comprises from about 0.001 to about 8 parts by weight strong acid per hundred parts by weight silica.

11. The method of claim 1, where the vulcanizable mixture comprises from about 0.01 to about 25 parts by weight silica coupling agent per hundred parts by weight silica.

12. The method of claim 1, where the vulcanizable mixture comprises from about 0.1 to about 25 parts by weight silica reactive dispersing agent per hundred parts by weight silica.

13. The method of claim 1, where from about 5 to about 100 percent of the total elastomer is silica-reactive functionalized elastomer.

14. The method of claim 1, where said step of adding strong acid occurs prior to or during said step of mixing ingredients including silica and at least one elastomer.

15. The method of claim 1, where said step of adding strong acid occurs prior to or during said step of further mixing the initial composition.

16. The method of claim 15, where said step of adding strong acid occurs after said step of cooling.

17. A method for preparing a tire, the method comprising the steps of:
   mixing ingredients including silica-reactive functionalized elastomer, silica, strong acid and optionally additional rubbery polymer to form an initial composition;
   cooling the initial composition;
   further mixing the initial composition, optionally with additional ingredients including a silica coupling agent and a silica reactive dispersing agent, to form an intermediate composition;
   adding ingredients including a curative to the intermediate composition to form a vulcanizable mixture;
   mixing the vulcanizable mixture;
   forming the vulcanizable mixture into a tire component;
   building a tire by including the tire component;
   curing the tire; where said strong acid has a $pK_a$ of less than or equal to the $pK_a$ of acetic acid when compared under standardized conditions.

18. The method of claim 17, where the silica-reactive functionalized elastomer includes an alkoxysilyl functional group.

19. A method for preparing a tire, the method comprising the steps of:
   mixing ingredients including silica and at least one elastomer to form an initial composition, where the elastomer optionally includes silica-reactive functionalized elastomer; cooling the initial composition;
   further mixing the initial composition with additional ingredients including at least one of a silica coupling agent and a silica reactive dispersing agent to form an intermediate composition;
   adding ingredients including a curative to the intermediate composition to form a vulcanizable mixture;
   mixing the vulcanizable mixture;
   forming the vulcanizable mixture into a tire component;
   building a tire by including the tire component;
   curing the tire; where said method includes the step of adding a strong acid, and where said strong acid is added prior to or during said step of further mixing.

* * * * *